United States Patent
Rasekhi

(10) Patent No.: US 9,168,190 B2
(45) Date of Patent: Oct. 27, 2015

(54) RAMP COMPRISING A LATERAL BARRIER

(75) Inventor: Abbas Rasekhi, Kassel (DE)

(73) Assignee: GEBR. BODE GMBH & CO. KG (DE)

( * ) Notice: Subject to any disclaimer, the term of this patent is extended or adjusted under 35 U.S.C. 154(b) by 124 days.

(21) Appl. No.: 13/879,353

(22) PCT Filed: Dec. 8, 2010

(86) PCT No.: PCT/EP2010/069191
§ 371 (c)(1),
(2), (4) Date: May 29, 2013

(87) PCT Pub. No.: WO2012/048759
PCT Pub. Date: Apr. 19, 2012

(65) Prior Publication Data
US 2014/0147237 A1    May 29, 2014

(51) Int. Cl.
*A61G 3/06* (2006.01)
*B60R 3/02* (2006.01)
*B61D 23/02* (2006.01)

(52) U.S. Cl.
CPC . *A61G 3/061* (2013.01); *B60R 3/02* (2013.01); *B61D 23/02* (2013.01)

(58) Field of Classification Search
CPC ........... B60R 3/02; B61D 23/02; A61G 3/061
USPC .................. 414/537, 921; 14/69.5, 71.1, 71.5
See application file for complete search history.

(56) References Cited

U.S. PATENT DOCUMENTS

| | | | | |
|---|---|---|---|---|
| 4,527,941 A | * | 7/1985 | Archer | 414/537 |
| 5,676,515 A | * | 10/1997 | Haustein | 414/537 |
| 6,238,168 B1 | * | 5/2001 | Cohn et al. | 414/537 |
| 8,556,283 B2 | * | 10/2013 | Coochesfahani | 280/166 |
| 2008/0184502 A1 | * | 8/2008 | Roberts | 14/71.1 |
| 2009/0035113 A1 | * | 2/2009 | Morris et al. | 414/537 |
| 2011/0146008 A1 | * | 6/2011 | Hansen | 14/71.1 |

FOREIGN PATENT DOCUMENTS

| | | |
|---|---|---|
| EP | 1946968 A1 | 7/2008 |
| GB | 2405852 | 3/2005 |
| WO | 2006031484 A2 | 3/2006 |
| WO | 2010072585 A1 | 7/2010 |

OTHER PUBLICATIONS

ISR PCT/EP2010/069191 dated Jan. 9, 2011.

* cited by examiner

*Primary Examiner* — Kaitlin Joerger
(74) *Attorney, Agent, or Firm* — Cantor Colburn LLP

(57) ABSTRACT

The invention relates to a boarding aid (20) for a motor vehicle, in particular a sliding step of a door entry of a passenger transportation vehicle, said boarding aid being capable of being moved from an idle position into a usage position and back in a direction, which runs parallel to the side edges (28), and encompassing a planar element (22), a front side, two side edges (28), and a rear side. The planar element (22), on its side edges (28), encompasses barriers (30), which can be moved from a first upright position, in which they extend upwards in relation to a stepping surface of the planar element (22), into a second lowered position and vice versa, wherein the movement of the barriers (30 is effected by moving the planar element (22).

8 Claims, 5 Drawing Sheets

RAMP COMPRISING A LATERAL BARRIER

FIELD

Disclosed is a boarding aid for a motor vehicle, in particular to a sliding step of a door entry of a passenger transportation vehicle, wherein the boarding aid can be moved from an idle position into a usage position and back.

BACKGROUND

Typical boarding and access aids are used in passenger transportation vehicles, for example in busses or rail vehicles for public local transportation. They are known in many different forms and facilitate the boarding and exiting in that sliding steps, which are supported on the vehicles so as to be capable of being displaced and oftentimes also so as to be capable of being pivoted and which are resilient, are extended in the area of stops. Sliding steps are thereby used to bridge gaps (for example in the case of train platforms) or also for a height compensation. Boarding aids can be embodied as simply being extendable sliding steps, but, in the extended state, they can also be lowered onto the ground, for example a train platform, so that they bear thereon. Boarding aids in particular also make it easier or make it possible for wheelchair users to board the vehicles. The boarding aid is brought back into its idle position after ending the exiting and boarding phase and possibly after closing the vehicle doors.

Boarding aids, which do not bear on in the extended state and which must accordingly be resilient, are on principle identified as sliding steps. On principle, they consist of a material, which is resistant and rigid, yet as light as possible and, on principle, are provided with a slip resistant coating.

Provision is made in the area of the sliding steps in the case of externally-controlled boarding aids for a motor, which moves the sliding step from its idle position and back into the usage position. Accessible sliding steps are guided laterally via rollers in guide means, via which they can be linearly retracted and extended. Motor-driven sliding steps are described in publications DE 20 2007 000 912 U1 and DE 20 2006 016 432 U1, for example. All of them are relatively high, which is increasingly undesired. Due to continuously increasing demands, vehicle manufacturers pay particular attention to boarding aids, in particular to the installation space in the critical entry area, which is necessary for it.

A significant disadvantage of known boarding aids is also that a lateral slipping or a misstep by the users is possible when exiting or boarding. In particular for wheelchair users, the use of the boarding aid is thus dangerous or even dangerous, respectively.

For this reason, sliding steps are known, which encompass lateral barriers having a height of several centimeters. Such barriers are arranged on side edges of the boarding aid in the form of a guard rail. A significant disadvantage is that, due to the lateral barriers, the boarding aids are higher and require accommodating boxes, which are dimensioned larger accordingly, below the door of the vehicle.

SUMMARY

The disclosure endeavors to create a boarding aid for motor vehicles, which provide for a safe and wheelchair-suitable boarding into the vehicles. The boarding aid is to thereby be designed so as to be as simple as possible and is to thereby be embodied as compact as possible. The above-mentioned disadvantages of the state of the art are to be avoided.

According to the disclosure, the task is solved by means of a boarding aid, in the case of which the planar element, on its side edges, encompasses barriers, which can be moved from a first upright position, in which they extend upwards in relation to a stepping surface of the planar element, into a second lowered position and vice versa, wherein the movement of the barriers is effected by moving the planar element.

The boarding aid is formed by means of a planar element or an extension, respectively, comprising two side edges, a front side, which can rest on a train platform, for example, and a rear side, which faces in the direction of the vehicle, wherein the lateral barriers are located in the area of the two side edges. The surface of the planar element, which is oriented upwards, forms a stepping surface.

The lateral barriers act in the form of a guard rail and encompass a height of between one and a plurality of, preferably five, centimeters. Typically, provision is made for two barriers, one barrier on each side edge, but a boarding aid, in the case of which a barrier is arranged on only one side edge, is also possible.

According to the disclosure, the lateral barriers are embodied such that they lower into a lowered position when the boarding aid is retracted or pulled back, respectively, so that the overall height of the boarding aid is substantially limited to the height of the planar element. This is advantageous in particular when the boarding aid is retracted into a box. When extending the boarding aid, the barriers set up in an upright position. The direction of movement of the boarding aid thereby typically runs into a direction, which runs parallel to the side edges.

In a particularly advantageous alternative, the two barriers are in each case formed by means of a barrier bar, which is connected to the planar element or the extension, respectively, via at least one, preferably a plurality of barrier arms. The barrier arms are fastened to the extension as well as to the barrier bar in an articulated manner and provide for a pivoting and thus an erecting and lowering of the barrier bar. In addition, either the barrier bar or a barrier arm, preferably the barrier arm, which is closest to the vehicle, is connected to the vehicle via a barrier rod, so that an erecting or lowering of the barriers, respectively, takes place automatically in response to the movement of the boarding aid of the extension. The connection of the barrier rod to the vehicle takes place on a stationary component, which contacts and holds the barrier rod at least when the planar element is just shy of and in its extended end position.

The barrier rod can be embodied as a component such that it is moved along in response to the extending and retracting of the boarding aid. In response to being extended, said barrier rod is moved into an end position. Due to the fact that the planar element is moved further out of the box, the barrier rod pulls up the barrier, which is connected to it, so that it is set up with the help of the barrier arms.

The boarding aid preferably encompasses a box for accommodating the extension comprising the barriers, which can be folded down. On its side, which faces a train platform, for example, the box can be open, but it can also be embodied so as to be capable of being closed with the help of a cover. In the event that provision is made for a cover, the latter opens before the extension is extended out of the box or the cover closes again, after the extension has been retracted completely, respectively. Side walls of the box and the extension can encompass guide means for ensuring an even extension of the extension. Preferably, provision can be made within the box for a guide roll, in which rollers, which are arranged on side edges of the extension, are guided.

Preferably, the two barriers are provided with a barrier rod, but it is also possible for only one of the barriers to encompass a barrier rod and for the opposite further barrier to also be erected or lowered by means of a corresponding mechanism, which connects the two barriers to one another. According to the disclosure, the barrier rod or the barrier rods, respectively, is or are connected to the extension and is or are also guided in a guide roll, so that the barrier rod moves back and forth with the extension. For this purpose, the barrier rod encompasses a corresponding caster or a comparable guide means, which runs in the respective barrier guide roll. Before the extension has been extended completely out of the box or has reached its end position, respectively, in response to being extended, the caster hits against the end of the barrier guide roll or against a corresponding element and remains in its position there. The end of the barrier guide roll can thus form the stationary component, via which the barrier is erected.

Instead of a guide for the barrier rod and a barrier guide roll, it is advantageously also possible for the barrier rod to be embodied as an arresting hook, which hooks into a bolt in response to the extension of the planar element and thus remains in its end position and erects the barrier.

The arresting hook is formed such that it only engages behind the bolt, so that it can disengage from the bolt without any problems when the extension is retracted, and can move back into its initial position.

In a further alternative embodiment, the barrier rod is embodied in a substantially L-shaped manner, thus encompasses a kink, which separates a longer section and a shorter section. The end of the longer section is connected to the barrier; the caster is arranged on the end of the shorter section. In the case of this design, provision is furthermore also made for a stationary bolt, which supports the lowering and the erecting of the barrier. In side view, the bolt is arranged below the barrier guide roll. In response to being extracted, the barrier rod, which is arranged so as to be substantially horizontal until then, reaches the bolt and slides along it, until the bolt reaches the kink of the L-shaped barrier rod. In this position, the caster has also reached its end position in the barrier guide roll. The further extension of the planar element or of the extension, respectively, now has the effect that the barrier moves into the upright position. The L-shape of the barrier rod has the advantage that the bolt presses onto the barrier rod diagonally from the top and thus facilitates folding in the barrier in response to the retraction. The diagonal position of the barrier rod keeps the barrier from not being folded in or over, respectively, or only with great difficulty, in an over-dead center position.

The stationary bolt and also the barrier guide roll can be arranged within a box as well as directly on the vehicle.

The barrier arms can either be hinged on the stepping surface of the planar element, which is oriented upwards, but they can also be supported laterally on the side edges. In the event that they are arranged laterally and are supported in an articulated manner, for example via bolts or pins, this has the advantage that the barriers in the lowered position do not stick out upward or downward beyond the height of the planar element. In the lowered state of the barriers, the planar element or boarding aid, respectively, is then not higher, but only wider by the amount of the two barriers. In contrast, in the event that the barrier arms are arranged on the stepping surface, the planar element, in the lowered state of the barrier, is not wider, but slightly higher. Both alternative embodiments can be advantageous, depending on the room conditions.

It is significant for all embodiments that the movement of the barriers is effected by the movement of the planar element.

BRIEF DESCRIPTION OF THE FIGURES

The disclosure will be defined in more detail below by means of the figures. The figures are to thereby only define an exemplary embodiment and are not to limit the invention to the details shown therein.

DETAILED DESCRIPTION

Figure 1:
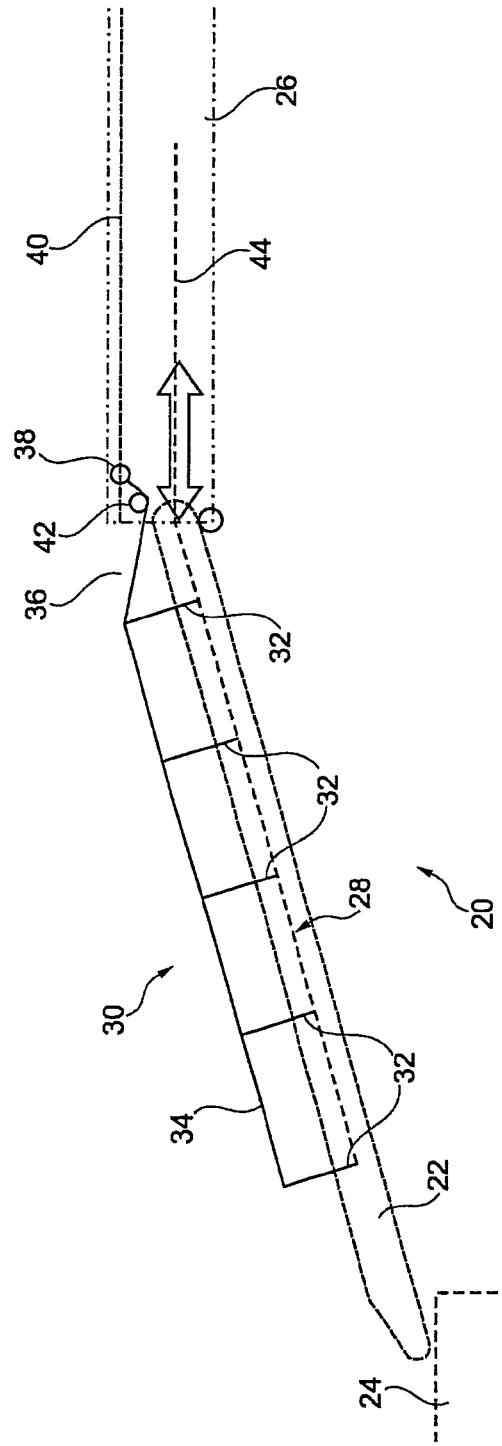
FIG. 1 shows a highly simplified schematic diagram of the boarding aid in side view.

FIG. 1 shows a boarding aid 20 in a simplified illustration in side view. In the illustrated example, an extension or planar element 22, respectively, serves to bridge a gap and rest on a train platform 24 for this purpose. The planar element 22 can be moved into a box 26 and can be moved out of it. The direction of movement thereby runs along side edges 28 of the planar element 22 and is illustrated by means of an arrow.

A barrier 30, which encompasses five barrier arms 32 in the illustrated exemplary embodiment, which are pivotably supported on the side edge 28, is arranged on the side edge 28. On their other ends, the barrier arms 32 of a barrier bar 34 are also connected in an articulated manner. The barrier 30 is connected to the box 26 via a barrier rod 36. A caster 38, which is guided in a barrier guide roll 40, is arranged on the end of the barrier rod 36. The barrier rod 36 is embodied in an L-shaped manner and is in contact with a bolt 42, which is fastened to the box 26. The planar element 22 is also guided in a guide roll 44.

Figure 2:
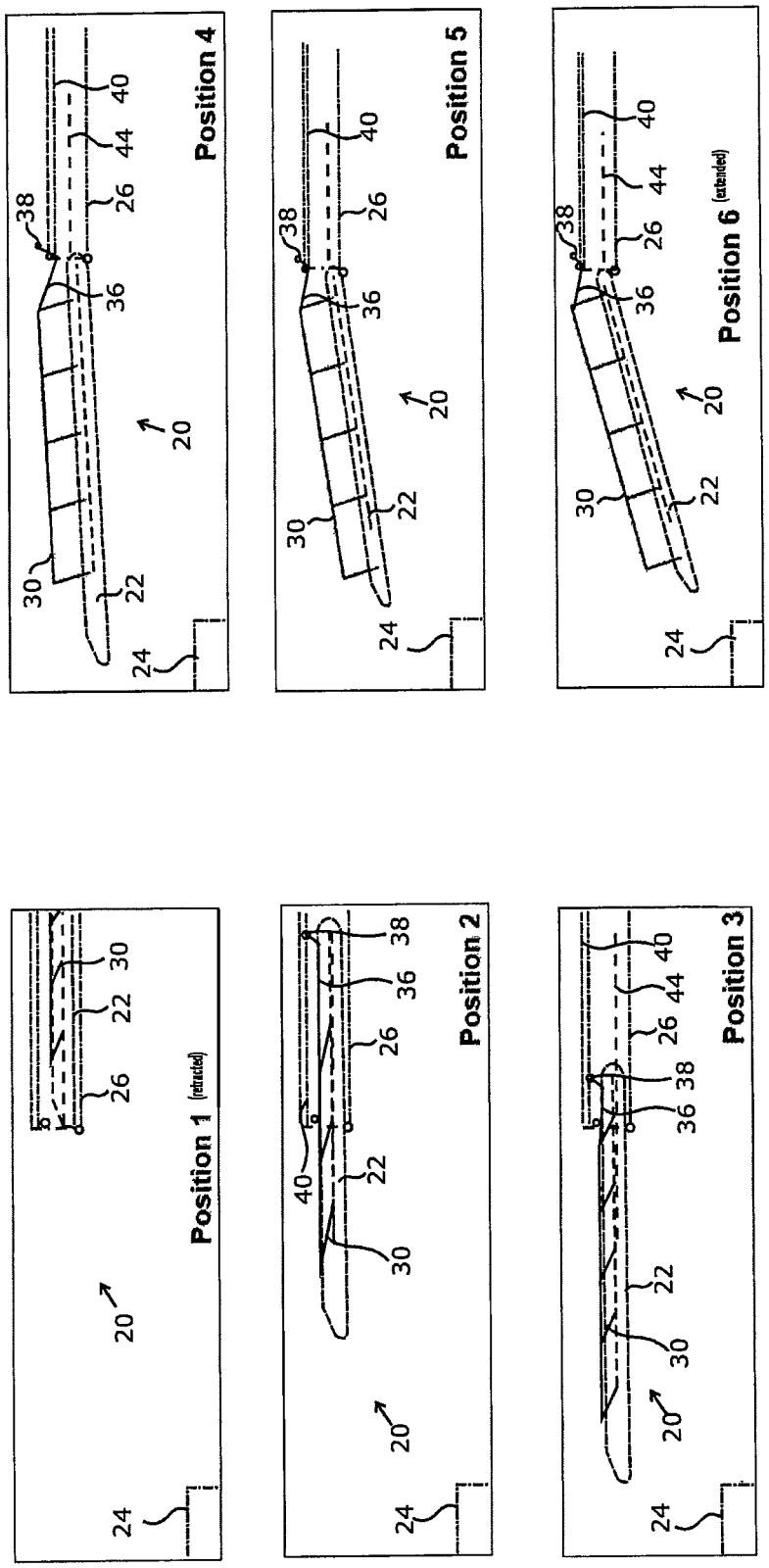
FIG. 2 shows a flowchart of the retracting or extending, respectively, of the planar element.

The mode of operation of the boarding aid 20 follows from FIG. 2. In position A, the planar element 22 is retracted completely and is completely extended in position F. The positions B, C, D and E show intermediate states of the retracting or extending process, respectively. It can be seen that the barrier rod 36 and the caster 38 move together with the planar element 22. When the caster 38 reaches the end of the barrier guide roll 40 in response to the extension of the planar element 22, the planar element 22 is extended further, whereby the barrier 30 is erected by means of the barrier rod 36. In opposite direction, thus in response to the retraction of the planar element 22, the bolt 42 pushes against the barrier rod 36, whereby the barrier 30 is pivoted in.

Figure 3:
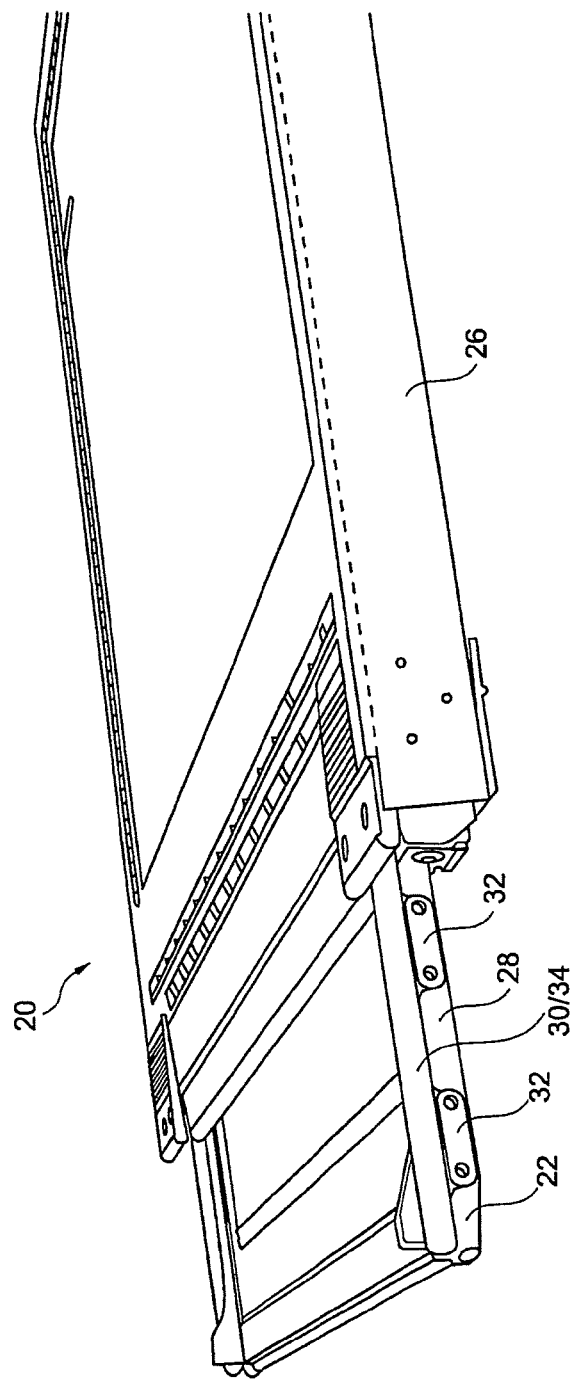
FIG. 3 shows an alternative embodiment with partly extended planar element.
Figure 4:
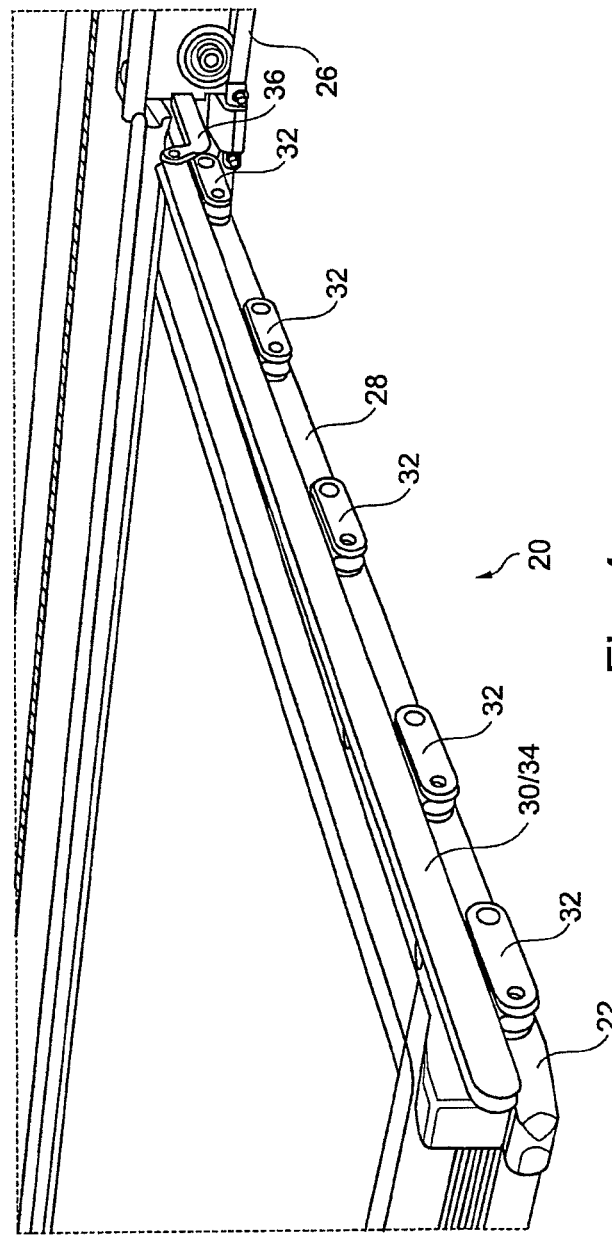
FIG. 4 shows the alternative embodiment from FIG. 3 with almost completely extended planar element.
Figure 5:
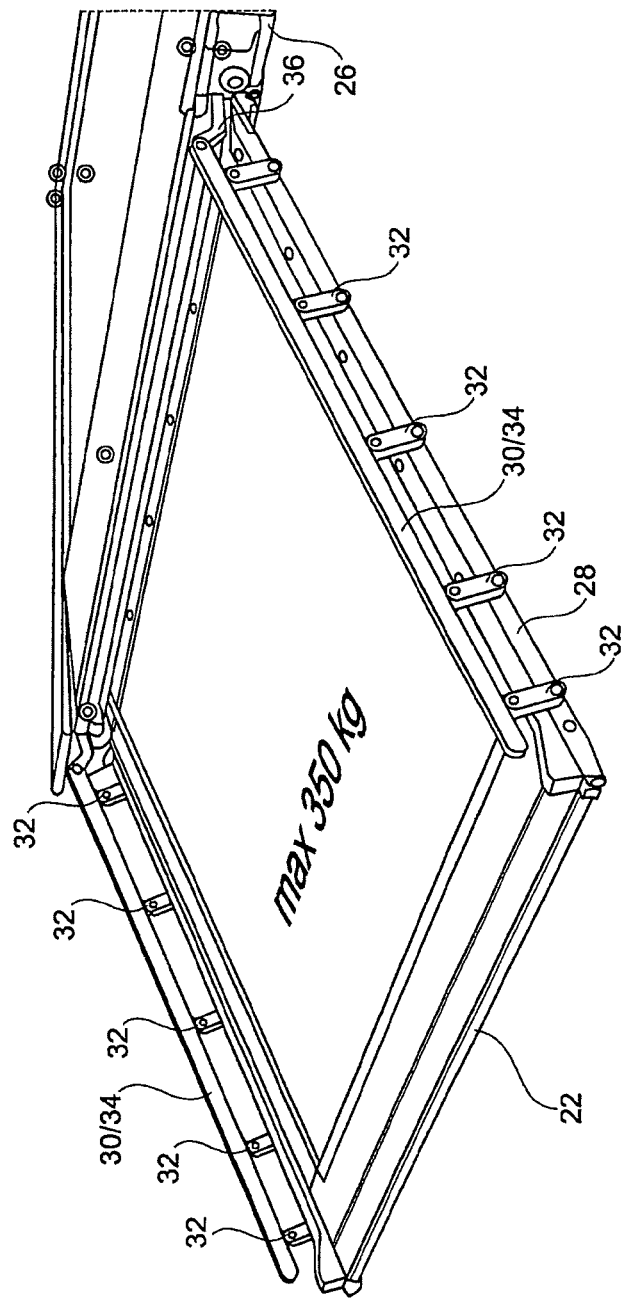
FIG. 5 shows the alternative embodiment from FIG. 3 with extended planar element in end position.

FIGS. 3-5 shows a preferred alternative embodiment. FIG. 3 shows the planar element 22 in an almost completely retracted state, FIG. 4 shows the planar element 22 shortly before the completely extended position and FIG. 5 shows the planar element in the extended end position. In the position according to FIG. 4, the caster 38 is on the front end of the barrier guide roll 40, in extension direction. Even though the barrier rod 36 is also formed in an L-shaped manner in this alternative embodiment, it differs from the barrier rod 36 of FIGS. 1 and 2. In the upright position, the barriers 30 can have different heights, depending on the installation conditions. A height of approximately 5 cm turned out to be advantageous and sufficient to ensure the safety for the users.

Due to the folding mechanism, the boarding aid 20 can be embodied so as to be quite flat or it not higher than a boarding aid 20 without barrier 30, respectively.

The drive of the planar element 22 can be embodied in different ways, e.g. by means of lateral arbors, which, in addition to being the drive, also take over the function of a guide, or also by means of a central drive, which requires additional (e.g. lateral) guide means. Further drive possibilities can also be realized, but they will not be discussed in the context of this patent application.

As already stated, the folding mechanism of the barriers 30 is suitable for all extendable boarding aids, wherein the use with a sliding step 22 must surely be considered to be the preferred alternative embodiment. However, the invention is not limited to the shown exemplary embodiment.

The invention claimed is:

1. A sliding step of a door entry of a passenger transportation vehicle, comprising:
   a planar element, a front side edges, and a rear side, the planar element being movable along said two side edges between a retracted position and an extended position;
   wherein the planar element, on its side edges, encompasses barriers, movable from a first upright position, in which they extend upwards in relation to a stepping surface of the planar element, into a second lowered position and vice versa, wherein the movement of the barriers is effected by further extending the planar element in a direction parallel to the side edges after the planar element is in the extended position;
   wherein each of the barriers encompass a barrier bar and at least one barrier arm, the barrier arm being supported on the planar element and on the barrier bar so as to be capable of being pivoted, so that the barrier can be erected and lowered; the barrier further encompassing a barrier rod, which at least in the first upright position, is in contact with a stationary component of the vehicle, the stationary component being arranged such that the barrier rod is already held on the stationary component in response to the extension of the planar elelment prior to reaching the end position of the planar element and that further extension movement of the planar element effects a movement of the barrier; and
   wherein the free end of the barrier rod encompasses a caster, which is guided in a barrier guide roll and that the stationary component is formed by means of an end stop of the barrier guide roll in an extension direction of the planar element.

2. The sliding step according to claim 1, wherein the barrier rod is embodied in an L-shaped manner.

3. The silding step according to claim 1, wherein, in side view of the sliding step, the stationary component is arranged below the barrier guide roll and contacts the barrier rod from the top.

4. The sliding step according to claim 1, wherein the at least one barrier arm is hinged on one of the side edges such that, in the second lowered position, the barrier is located completely laterally next to the planar element and does not exceed the height of the planar element.

5. The sliding step according to claim 1, wherein provision is made for a box for accommodating the planar element, wherein the barrier guide roll and/or the stationary component are arranged within the box.

6. A sliding step of a door entry of a passenger transportation vehicle, comprising:
   a planar element, a front side, two side edges, and a rear side, the planar element being movable along said two side edges between a retracted position and an extended position;
   wherein the planar element, on its side edges, encompasses barriers, movable from a first upright position, in which they extend upwards in relation to a stepping surface of the planar element, into a second lowered position and vice versa, wherein the movement of the barriers is effected by further extending the planar element in a direction parallel to the side edges after the planar element is in the extended position;
   wherein each of the barriers encompass a barrier bar and at least one barrier arm, the barrier arm being supported on the planar element and on the barrier bar so as to be capable of being pivoted, so that the barrier can be erected and lowered; the barrier further encompassing a barrier rod, which at least in the first upright position, is in contact with a stationary component of the vehicle, the stationary component being arranged such that the barrier rod is already held on the stationary component in response to the extension of the planar element prior to reaching the end position of the planar element and that further extension movement of the planar element effects a movement of the barrier; and
   wherein the free end of the barrier rod encompasses a caster, which is guided in a barrier guide roll and that the stationary component is formed by means of an end stop of the barrier guide roll in an extension direction of the planar element, the stationary component being arranged below the bather guide roll and in contact with the bather rod from a side view of the sliding step.

7. The sliding step according to claim 6, wherein the at least one barrier arm is hinged on one of the side edges such that, in the second lowered position, the barrier is located completely laterally next to the planar element and does not exceed the height of the planar element.

8. The sliding step according to claim 6, wherein provision is made for a box for accommodating the planar element, wherein the barrier guide roll and/or the stationary component are arranged within the box.

* * * * *